July 10, 1951  B. S. BJARNASON  2,559,586
INSTRUMENT FOR AND METHOD OF GEOPHYSICAL EXPLORATION
Filed Dec. 5, 1946
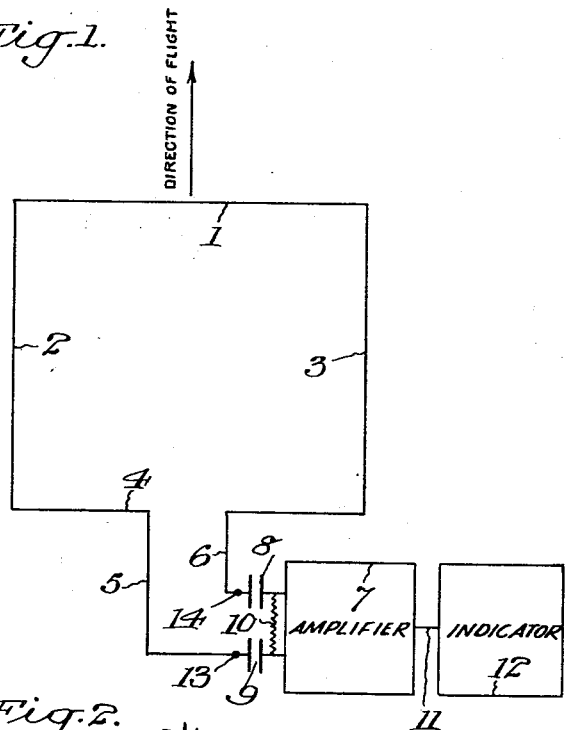
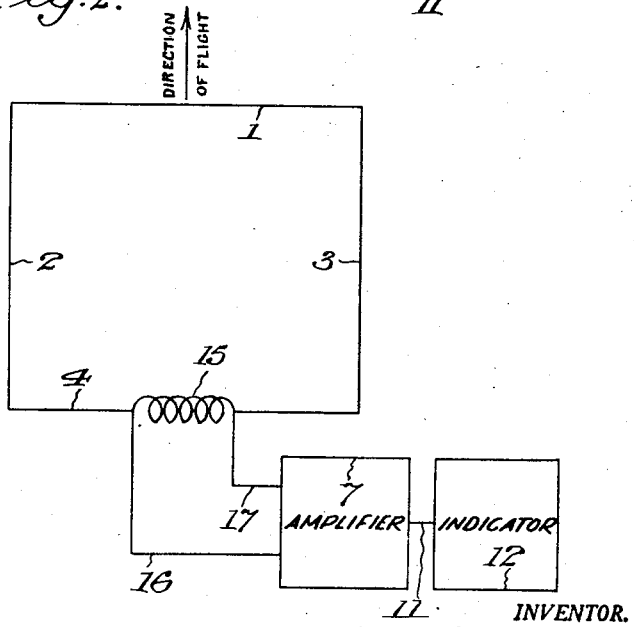
INVENTOR.
Bjarni S. Bjarnason
BY
his attorney Patented July 10, 1951

2,559,586

UNITED STATES PATENT OFFICE 2,559,586

INSTRUMENT FOR AND METHOD OF GEOPHYSICAL EXPLORATION

Bjarni S. Bjarnason, Toronto, Ontario, Canada, assignor to Hans T. F. Lundberg, Toronto, Ontario, Canada Application December 5, 1946, Serial No. 714,206

6 Claims. (Cl. 175—183)

This invention relates to an instrument for and method of geophysical exploration, and more particularly to an instrument adapted to detecting and recording variations or anomalies in the earth's magnetic field and to the method of locating significant and/or valuable deposits beneath the earth's surface. While the utility of the instrument is somewhat broad or general in scope, it is especially fitted to exploration conducted with the instrument and the operator on a moving support such, for instance, as an air vessel, either lighter or heavier than air, and still more particularly an airplane of the helicopter type, which latter is peculiarly capable of movement, at relatively high or low speeds, in horizontal, vertical, and angular directions, as well as to remain substantially motionless in any selected location.

The invention has for an object to provide an instrument for the purpose stated that is notably simple and inexpensive in construction and operation.

Another object is to provide such an instrument which is competent to detect variations in the strength of the earth's magnetic field, and more particularly the vertical component thereof, as the air vessel in which it is mounted travels a predetermined substantially horizontal course.

Another object is to provide such an instrument which embodies a coil, preferably of substantially rectangular formation, a plurality of portions of which are fitted to be located in the vessel in spaced parallelism at right angles to the longitudinal axis of the vessel, whereby variations in the vertical component of the earth's magnetic field as they successively affect the said portions of the coil may be detected and recorded during a substantially horizontal flight along a chosen course.

Another object is to provide such an instrument which includes means in the nature of a step-up transformer for the purpose of intensifying the differences or variations in the earth's magnetic field as successively received by the above named spaced parallel portions of the coil.

Another object is to provide such an instrument which, when rotated 90° on its horizontal axis, may be used to detect variations in the horizontal component of the earth's magnetic field.

Another object is to provide a method of geophysical exploration in which the above described instrument, or the like may be used and variations or anomalies in the vertical or horizontal component of the earth's magnetic field may be automatically received, detected and recorded during flight for subsequent direct investigation.

A further object is to provide certain improvements in the form, construction, arrangement and material of the instrument or apparatus, and in the steps of the method, whereby the above named and other objects may be effectively attained.

Practical embodiments of the instrument of this invention are represented in the accompanying drawing in which Fig. 1 represents a diagrammatic layout of the instrument and its positioning with respect to the air vessel; and Fig. 2 represents a similar view of a modified form.

In an application for U. S. patent filed by Hans T. F. Lundberg and Theodore Zuschlag on November 1, 1944, Serial No. 561,436, there is disclosed apparatus for and method of geophysical exploration wherein instruments for detecting and recording ground anomalies are transported by means including air vessels and, more particularly, helicopter type airplane, whereby the exploration may be accomplished with the use of electric, or magnetic, or electromagnetic means, or combinations thereof; and the present invention finds its predominant utility and value in an exploration procedure conducted as just set forth wherein the determinations realized are based upon magnetic investigations of effects produced by sought for deposits in the ground or by ground characteristics which are significant with respect to the existence, location and size of sought for deposits.

With reference to the form of the invention represented in Fig. 1, a loop coil, which may be composed of one or more turns of insulated copper wire, or other suitable material, is provided in rectangular form having sides or portions denoted by 1, 2, 3 and 4, portions 1 and 4, being substantially parallel to each other and portions 2 and 3 being substantially parallel to each other and substantially perpendicular to portions 1 and 4. Portion 4 from which the output of the loop is taken off is connected by wires 5 and 6 with the input of an amplifier 7 of the high gain linear response low frequency type, the said wires 5 and 6 being interrupted by condensers 8, 9 and being connected by a resistance 10. The output of amplifier 7, in turn, is suitably connected, as denoted by cable 11, to an indicator 12 which, may, for instance, be a graphic recording meter or an oscilloscope. A camera synchronized with the oscilloscope may be provided to photograph the indications; while a similarly synchronized continuous recording aerial camera may also be employed to photograph the ground area being surveyed so that the anomalies or significant indications received may be located on the photographs of the area for later interpretation, evaluation, correlation and direct investigation of their geological features.

In operation, the loop coil is suitably positioned in the air vessel, such as a helicopter plane, with its sides or portions 1 and 4 substantially at right angles to, and its sides or portions 2 and 3 substantially parallel with, the chosen direction of flight indicated by the arrow thus inscribed, which normally will be in line with or parallel to the longitudinal axis of the vessel; and with the loop coil as a whole substantially parallel with the general horizontal plane of the vessel so that the loop will lie in a horizontal position with respect to the surface of the earth when the vessel is in such a position. The correct horizontal positioning and orientation of the loop is preferably insured by mounting the instrument on a gyroscopically controlled or stabilized support which will eliminate effects resulting from dipping, wavering or lurching of the vessel. As the flight proceeds on a substantially horizontal course, the portions 1 and 4 of the loop will cut the lines of force of the vertical component of the earth's magnetic field with the result of developing electromotive forces therein. These forces will be developed in the portions 1 and 4 of the loop because they lie substantially at right angles to the direction of flight, but no such forces will be developed in the portions 2 and 3 of the loop since they are parallel with the flight. If, now, the vertical component of the magnetic field encountered by portion 1 of the loop is of the same magnitude as the vertical component encountered at the same instant by the portion 4 of the loop, the two electromotive forces developed in the said portions will cancel each other because of their equality and opposite polarity, so that there will be no difference in potential at the points indicated by the dots 13, 14 in wires 5, 6. If, however, the vertical components of the earth's magnetic field encountered by the portions 1 and 4 of the loop at any given instant are of different magnitude or intensity, a corresponding difference in electromotive force will be generated in the said portions and will be reflected as differences in potential at the points 13 and 14. This difference in potential will be transferred to the amplifier-indicator unit 7, 12, and will there be recorded and translated in terms of a magnetic anomaly reflecting the difference between and/or ratio of the intensities or magnitudes of the vertical components of the earth's magnetic field which have acted upon the portions 1 and 4 of the loop, as just described. It may here be noted that forms or types of amplifiers and indicators to which reference has hereinabove been made and which are merely diagrammatically represented in the drawing are known and available to those skilled in this art, so that no description of their structure, arrangement or adjustment is herein required. Following the completion of such a flight and survey along a predetermined course or profile, further flights and surveys along additional courses or profiles may be made, and the sum of the data thus obtained may be interpreted for the purpose of ascertaining the location and other characteristics of sought for or significant subterranean deposits or formations.

If desired, the aerial photographs of the terrain may be supplemented by the dropping of markers, such as containers of paint or stakes with flags, at points indicated by the instruments as desirable for direct geophysical investigation.

Turning now to the modified form of the invention represented in Fig. 2 of the drawing, the parts are the same as those set forth in Fig. 1 except that the condensers 8, 9 and the resistance 10 are omitted, and a winding 15 of insulated copper wire, or other suitable material, is placed around the portion 4 of the loop with its ends connected by wires 16, 17 with the amplifier 7. This winding 15 acts as the secondary of a step-up transformer for differences in electromotive forces developed in the portions 1 and 4 of the loop, as hereinabove explained; and the electromotive force which is generated across the winding 15 is applied or conducted by the wires 16, 17 to the amplifier-indicator unit where it is received and recorded as described in connection with the form of invention shown in Fig. 1.

In the drawings the loop 1, 2, 3, 4 is shown as of a rectangular shape in which the portions 2 and 3 are nearly as long as the portions 1 and 4; but this relationship in the length of the said portions is not an essential of the invention, as both the size and shape of the rectangular loop may be varied at will to suit the circumstances bearing upon manufacture, installation, and use. Likewise, the structure and arrangement of the amplifier-indicator unit may be varied so long as its capacity for receiving and recording detected anomalies or variations of geological significance is not eliminated.

If it should be desired to amplify the data obtained during the survey, the operator may detect and record variations in the horizontal component of the earth's magnetic field, by proceeding as herein above described except that the loop is rotated ninety degrees (90°) on its transverse horizontal axis so that the side or portion 1 is vertically above the side or portion 4. As an alternative method the loop may be rotated ninety degrees (90°) on its longitudinal horizontal axis. In both cases the plane should be flown along a course which is substantially at right angles to the magnetic meridian; any errors in direction of flight being compensated, as in the flights for detecting variations in the vertical component of the field, by the orienting capacity of the stabilized mounting for the instrument.

The instrument constituting the subject matter of this invention, though very simple in construction and operation, is extremely effective for its intended purpose, and enables geological surveys, especially of a preliminary nature, to be conducted with great celerity and ease over large areas regardless of the formation or character of the terrain; thus eliminating arduous, time-consuming, and expensive operations which would necessarily be involved in surveys conducted on the ground especially over difficult or water covered areas.

It will be understood that various changes may be resorted to in the form, construction, arrangement, and material of the parts, and in the steps of the method, without departing from the spirit and scope of the invention; and hence I do not intend to be limited to details herein shown or described except as they may be included in the claims or required by disclosures of the prior art.

What I claim is:
1. In combination with a maneuverable air- craft, an instrument designed for geophysical exploration therefrom, said instrument comprising, a loop composed of material sensitive to magnetic effects and having a plurality of substantially parallel portions which are spaced from each other so that electromotive forces of measurable difference can be generated in said portions when the loop is moved through a magnetic field in a direction substantially at right angles to the longitudinal axes of said portions, and output take-off means connected to one of said portions for detecting differences in said electromotive forces generated in said portions when the loop is moved as above set forth, said loop being positioned on the craft with said substantially parallel portions extending substantially at right angles to the longitudinal axis of the craft and the portion of the loop to which the output take-off means is connected being nearer the rear end of the craft than the other said portion of the loop.

2. A combination as defined in claim 1, which also includes means for stabilizing the loop with respect to both level and orientation carried by the craft in operative connection with the loop.

3. A combination as defined in claim 1, which also includes means for permitting the loop to be adjusted to a position either in substantial parallelism with the longitudinal horizontal axis of the craft or substantially at right angles to said axis.

4. A method of geophysical exploration which includes the following steps: mounting on a maneuverable aircraft a loop composed of material sensitive to magnetic effects and having a plurality of substantially parallel portions which are spaced from each other so that electromotive forces of measurable difference can be generated in said portions when the loop is moved through a magnetic field in a direction substantially at right angles to the longitudinal axes of said portions; arranging the loop on the craft in such a position that the longitudinal axes of its said portions are substantially at right angles to the longitudinal axis of the craft; connecting with the said portion of the loop that is nearer the rear end of the craft output take-off means for detecting differences in electromotive forces generated in said two portions of the loop; causing the craft to traverse a course passing through the earth's magnetic field; detecting such differences generated in said substantially parallel portions of the loop; and recording said detected differences.

5. A method as defined in claim 4, which also includes the step of stabilizing the loop with respect to level and orientation against motions of the craft.

6. A method as defined in claim 5, which also includes the step of step-up transforming said differences in electromotive forces before they are detected and recorded.

BJARNI S. BJARNASON.

REFERENCES CITED

The following references are of record in the file of this patent:

UNITED STATES PATENTS

| Number | Name | Date |
|---|---|---|
| 1,988,521 | Sperry et al. | Jan. 22, 1935 |
| 2,206,768 | Drake | July 2, 1940 |
| 2,291,692 | Cloud | Aug. 4, 1942 |
| 2,331,617 | Moore | Oct. 12, 1943 |
| 2,382,743 | Penther et al. | Aug. 14, 1945 |
| 2,388,683 | Frickey et al. | Nov. 13, 1945 |
| 2,404,806 | Lindsey | July 30, 1946 |
| 2,407,202 | Vacquier | Sept. 3, 1946 |
| 2,468,554 | Hull | Apr. 26, 1949 |

OTHER REFERENCES

American Institute of Mining and Mechanical Engineers, Geophysical Prospecting, 1932, pages 213-214.

Certificate of Correction

Patent No. 2,559,586 July 10, 1951

BJARNI S. BJARNASON

It is hereby certified that error appears in the printed specification of the above numbered patent requiring correction as follows:

Column 4, line 75, and column 5, lines 1 and 2, strike out "In combination with a maneuverable aircraft, an instrument designed for geophysical exploration therefrom," and insert instead *Apparatus adapted for geophysical exploration from the air comprising, the combination of a maneuverable airplane and a detecting instrument carried thereby,*;

and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*